US007077113B2

(12) United States Patent
Bilek et al.

(10) Patent No.: US 7,077,113 B2
(45) Date of Patent: Jul. 18, 2006

(54) COMBINED INTERCOOLER AND FLAME ARRESTER

(75) Inventors: Andreas Bilek, Buchkirchen (AT);
Alois Wolfsgruber, Gmunden (AT);
Rudolf Tscherne, Buchkirchen (AT);
Jean-Charles Pouillard, Schulusslberg (AT); Michael Sonnleitner, Kirchdorf an der Krems (AT)

(73) Assignee: BRP-Rotax GmbH & Co. KG, Gunskinchen (AT)

( * ) Notice: Subject to any disclaimer, the term of this patent is extended or adjusted under 35 U.S.C. 154(b) by 48 days.

(21) Appl. No.: 10/734,643

(22) Filed: Dec. 15, 2003

(65) Prior Publication Data

US 2004/0206340 A1 Oct. 21, 2004

Related U.S. Application Data

(60) Provisional application No. 60/433,014, filed on Dec. 13, 2002.

(51) Int. Cl.
*F02B 33/00* (2006.01)
(52) U.S. Cl. .................. 123/563; 123/540; 165/125
(58) Field of Classification Search ................ 123/563, 123/540, 542; 165/125, 126, 157
See application file for complete search history.

(56) References Cited

U.S. PATENT DOCUMENTS

| 3,976,041 | A | * | 8/1976 | Mettig et al. | 123/563 |
| 4,056,143 | A | * | 11/1977 | Martin | 165/176 |
| 4,269,158 | A | * | 5/1981 | Berti | 123/563 |
| 4,327,801 | A | * | 5/1982 | Koizumi et al. | 165/104.21 |
| 4,377,203 | A | * | 3/1983 | Ejima | 165/125 |
| 4,972,902 | A | * | 11/1990 | Ninomiya | 165/70 |
| 4,986,349 | A | * | 1/1991 | Ono | 165/154 |
| 5,375,565 | A | | 12/1994 | Maxson et al. | |
| 5,709,187 | A | | 1/1998 | Jaeger et al. | |
| 6,561,265 | B1 | * | 5/2003 | Ohira et al. | 165/154 |
| 6,634,420 | B1 | * | 10/2003 | Gokan et al. | 165/157 |
| 6,658,880 | B1 | * | 12/2003 | Bruzzo | 62/238.3 |
| 2004/0055740 | A1 | * | 3/2004 | Meshenky et al. | 165/125 |

FOREIGN PATENT DOCUMENTS

JP 3-54354 3/1991

* cited by examiner

*Primary Examiner*—John T. Kwon
(74) *Attorney, Agent, or Firm*—Osler, Hoskin & Harcourt LLP

(57) ABSTRACT

A combined flame arrester and intercooler for cooling intake gas for an internal combustion engine is disclosed. The intercooler comprises an elongated body having a longitudinal axis. The elongated body has a central passageway that extends substantially parallel to the longitudinal axis. An inlet opening is located on one end of the elongated body such that the intake gas enters the central passageway though the inlet opening. The intercooler further includes a plurality of cooling tubes forming at least a portion of the elongated body. The plurality of tubes substantially surround the central passageway. Each of the cooling tubes is spaced from an adjacent cooling tube such that an air flow path is formed there between. The intake gas is cooled by flowing past the cooling tubes. Preferably, the intake gas flows along the central passageway in the elongated body and radially outward therefrom through the air flow path between the cooling tubes. The intercooler includes at least one plate extending substantially orthogonal to the longitudinal axis. Each plate includes a central opening therein, which corresponds to the central passageway in the elongated body such that the intake gas is capable of flowing through the central opening. Each plate has a plurality of openings formed thereon about a periphery of the plate. One cooling tube is fed through each opening.

31 Claims, 7 Drawing Sheets

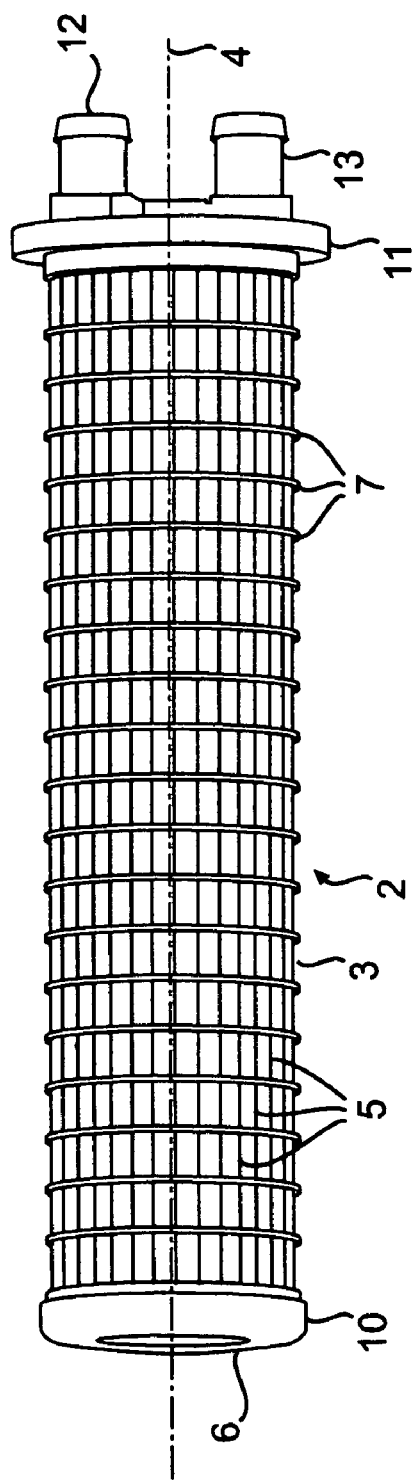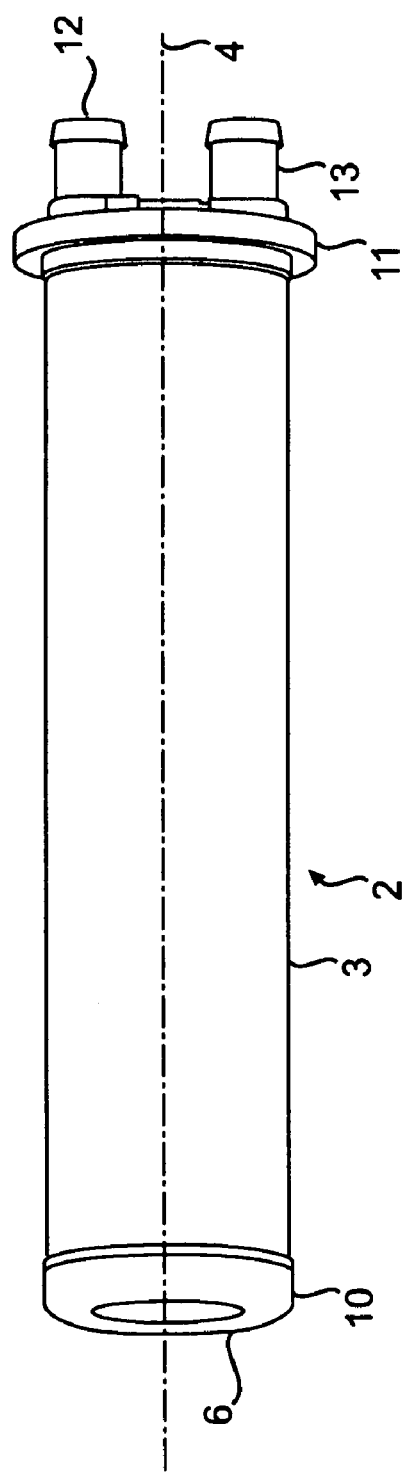

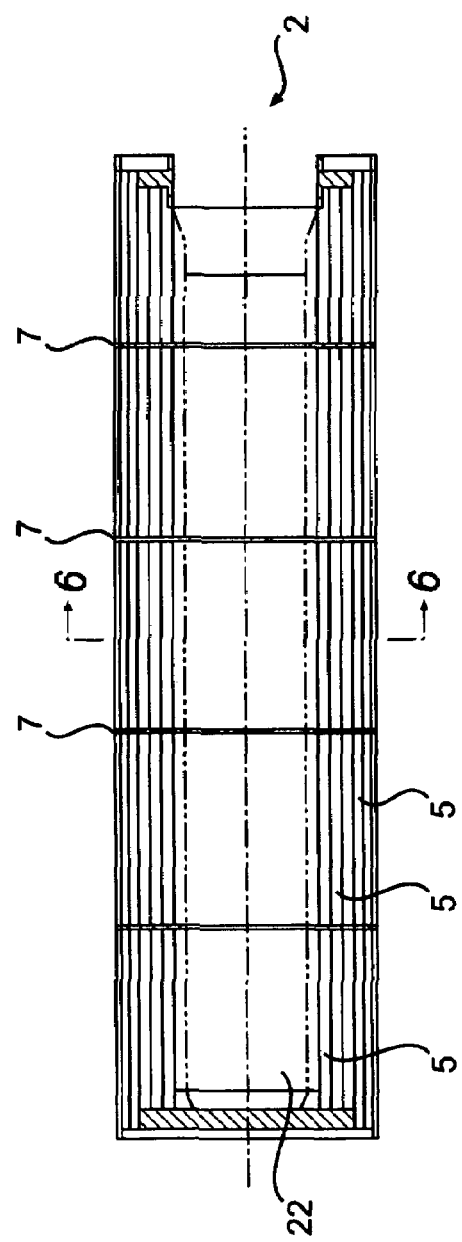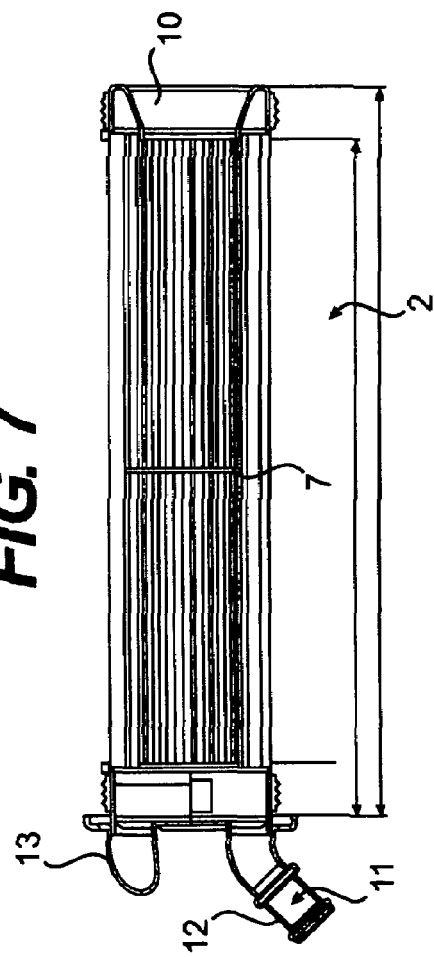
FIG. 7
FIG. 8

COMBINED INTERCOOLER AND FLAME ARRESTER

CROSS-REFERENCE TO RELATED APPLICATIONS

This application relates to and claims priority to U.S. Provisional Patent Application No. 60/433,014, filed on Dec. 13, 2002, the contents of which are incorporated herein by reference.

BACKGROUND OF THE INVENTION

1. Field of the Invention

The present invention relates to an internal combustion engine having a flame arrester arranged in an induction system of the engine. In particular, the present invention relates to a flame arrester that is combined with a cooler for the air or mixture of air and gas that is to be drawn into the cylinder or cylinders of the engine.

2. Description of Related Art

According to the prior art, flame arresters are typically arranged in or adjacent the intake port of an internal combustion engine. JP 03054354 A discloses a flame arrester that is incorporated into the induction system of an internal combustion engine so as to prevent the induction system from being damaged by the cylinder backfiring into the induction system. The flame arrester confines any possible backfires to the area between the flame arrester and the cylinder of the engine. According to JP 03054354 A, the flame arrester is essentially constructed like a cooler through which coolant flows through a plurality of water tubes. The gas that is to be burned in the engine flows through the flame arrester past the water tubes. The flame arrester is arranged in the intake port of the engine, between a combustion chamber and a throttle valve and positioned downstream of the fuel injector. Because of its great capacity for absorbing heat it is intended to prevent flames from spreading into the area ahead of the flame arrester. This flame arrester, however, is not well suited for use in most internal combustion engines because of the size constraints associated with most engines. The flame arrester can only be integrated into an induction system at considerable cost.

U.S. Pat. No. 5,375,565 A describes a flame arrester for internal combustion engines. The flame arrester includes a cylindrical housing with an inlet opening and an outlet opening, and a plurality of honeycomb channels between the inlet opening and the outlet opening. Each of the channels is of a predetermined length and a predetermined cross section. The cylindrical housing is arranged in the induction manifold of the internal combustion engine and is for use in supercharged engines. The cooling achieved by this arrangement, however, is limited because the heat that is transferred from the hot gas to the channels can only be dissipated through the housing.

BRIEF SUMMARY OF THE INVENTION

It is an aspect of the embodiments of the present invention to provide a flame arrester that occupies a minimal amount of space within the engine while providing a powerful charge-air cooler for an internal combustion engine.

The combined flame arrester and intercooler has an elongated base body that is formed by cooling tubes that are preferably arranged parallel to one another and spaced apart from each other. The tubes are arranged to provide a central air passage through which charge air enters the flame arrester before entering the desired intake passages. A coolant flows through these tubes. The charge air flows radially through the base body, and in so doing flows radially around the tubes. Such an arrangement permits a single flame arrester to be used to cool charge air being supplied to more than one cylinder.

Effective cooling of the charge air and a reliable flame arrester will result if the base body incorporates a passage that extends radially for the charge air. Charge air will enter the core of the base body axially and then flow through the base body from the inside to the outside, through the intermediate spaces between the individual tubes, so that heat is exchanged between the charge air and the coolant. In exactly the same way, a backfire can flow through the base body in the opposite direction. Flame inhibition and resistance to flow can both be adjusted by the spacing between the individual tubes.

Plates are installed between the tubes, transversely to the longitudinal axis of the tubes, so as to increase the cooling effect on the charge air, and to enhance the stability of the base body and the effectiveness of the flame arrester. These plates fix the positions of the tubes relative to one another and, at the same time, they serve as large-area cooling fins. The number and spacing of the individual plates are both selected as required, for example as a function of the heat that is to be dissipated, flame-propagation safety, and the like. The number of plates can vary. Usually, the plates are formed of sheet metal and incorporate a central opening for the charge-air feed. The size of the central opening can vary. Each plate also has a plurality of holes spaced around their peripheries through which the tubes pass. Tubes and plates are soldered, cemented, pressed, or welded to one another.

In order to keep the installed size of the combined flame arrester and charge-air cooler as small as possible, an end piece that connects the tubes to one another is provided. An inlet/outlet connector is provided to connect a specific number of tubes to a coolant feed and the remaining tubes to a coolant return. Coolant then flows in through the coolant feed passes through half the tubes from the connector to the outlet connector, and is then fed back from the outlet connector through the other half of the tubes to the inlet connector, where it is discharged through the coolant outlet. Because of it small installed size, the combined flame arrester/charge air cooler according to the present invention can be integrated very easily into an induction system. Furthermore, it can cool the charge air for one or more cylinders.

In accordance with the embodiments of the present invention, an intercooler for cooling intake gas for an internal combustion engine is disclosed. The intercooler preferably functions as both an intercooler and a flame arrester for arresting backfires from the engine cylinders before the flames can exit the intake manifold. Thereby any blowing out of the backfire into the engine compartment is prevented. The internal combustion engine has an intake manifold, wherein the intake manifold supplies intake gas to at least one engine cylinder. The intercooler comprises an elongated body having a longitudinal axis. The elongated body has a central passageway that extends substantially parallel to the longitudinal axis. An air inlet opening is located on one end of the elongated body such that the intake gas enters the central passageway though the inlet opening. The intercooler further includes a plurality of cooling tubes forming at least a portion of the elongated body. The plurality of tubes substantially surround the central passageway. Each of the cooling tubes is spaced from an adjacent cooling tube such that an air flow path is formed there between. The intake gas is cooled by flowing past the cooling tubes. Preferably, the intake gas flows along the central passageway in the elongated body and radially outward therefrom through the air flow path between the cooling tubes. The plurality of cooling tubes may extend substantially parallel to the longitudinal axis.

The plurality of cooling tubes include a first group of cooling tubes operatively connected to a coolant inlet and a second group of cooling tubes operatively connected to a coolant outlet. The first group of cooling tubes is operatively connected to the second group of cooling tubes such that a coolant flows from the coolant inlet into the first group of cooling tubes, the coolant then flows through the first group of cooling tubes to the second group of cooling, the coolant then exits the second group of cooling tubes through the coolant outlet. An outlet ring can operatively connect the first group of cooling tubes to the second group of cooling tubes such that the coolant flows from the first group of cooling tubes to the second group of cooling tubes.

The intercooler further includes an inlet ring connected to one end of the elongated body. The inlet ring includes the coolant inlet and the coolant outlet. The inlet ring can be connected to a closed loop cooling system or an open loop cooling system.

The intercooler in accordance with embodiments of the present invention further includes at least one plate extending substantially orthogonal to the longitudinal axis. Each plate includes a central opening therein, which corresponds to the central passageway in the elongated body such that the intake gas is capable of flowing through the central opening. Each plate has a plurality of openings formed thereon about a periphery of the plate. One cooling tube is fed through each opening. A plurality of plates can be spaced along the longitudinal axis of the elongated body. According to a preferred embodiment, with such an arrangement, the diameter of the central opening can be varied between plates to adjust the flow rate within the central passageway such that an equal volume of intake gas is supplied to each engine cylinder. This is especially useful when the volume of the surge tank is minimized (the intake trumpets are positioned close by the intercooler). The intercooler in accordance with embodiments of the present invention permits the use of a single intercooler for cooling the intake gas that is supplied to any one of a multiple of cylinders. Similarly, a single intercooler can be used as a flame arrester to limit the passage of back fires from any of the cylinders connected to the same intake manifold.

BRIEF DESCRIPTION OF THE DRAWINGS

The invention will be described in conjunction with the following drawings in which like reference numerals designate like elements and wherein:

FIG. 2 is an enlarged schematic view of the combined flame arrester and cooler of FIG. 1;

FIG. 3 is a variant of the combined flame arrester and cooler shown in FIG. 2;

FIG. 7 is a side cross sectional view of the combined flame arrester and cooler of FIG. 6;

FIG. 8 is a side cross sectional view of the combined flame arrester and cooler according to another embodiment of the present invention;

DETAILED DESCRIPTION OF THE PREFERRED EMBODIMENTS

An internal combustion engine has an air intake system or induction system 1. It is contemplated that the internal combustion engine can be used in personal watercraft, all terrain vehicles, snowmobiles, boats, outboard engines and other vehicles. The induction system 1 is connected to the cylinder head housing (not shown) of the internal combustion engine on a side of the engine opposite an exhaust manifold, as described, for example, in U.S. Pat. No. 6,601, 528 to Bilek et al, entitled "Four Stroke Engine With Intake Manifold," the entire disclosure of which is incorporated herein by reference. The air intake into the engine is effected via an air box, not shown. Air entering the air box can flow through a tube connecting the air box with the engine, and then passes to an air intake manifold or plenum 14, of the induction system 1. The air manifold 14 is preferably formed from a plastic material, however, other materials are contemplated including, metals, high strength alloys and other suitable synthetic materials may be used. From the air intake manifold 14, the charge air flows into one or more cylinders.

Figure 1:
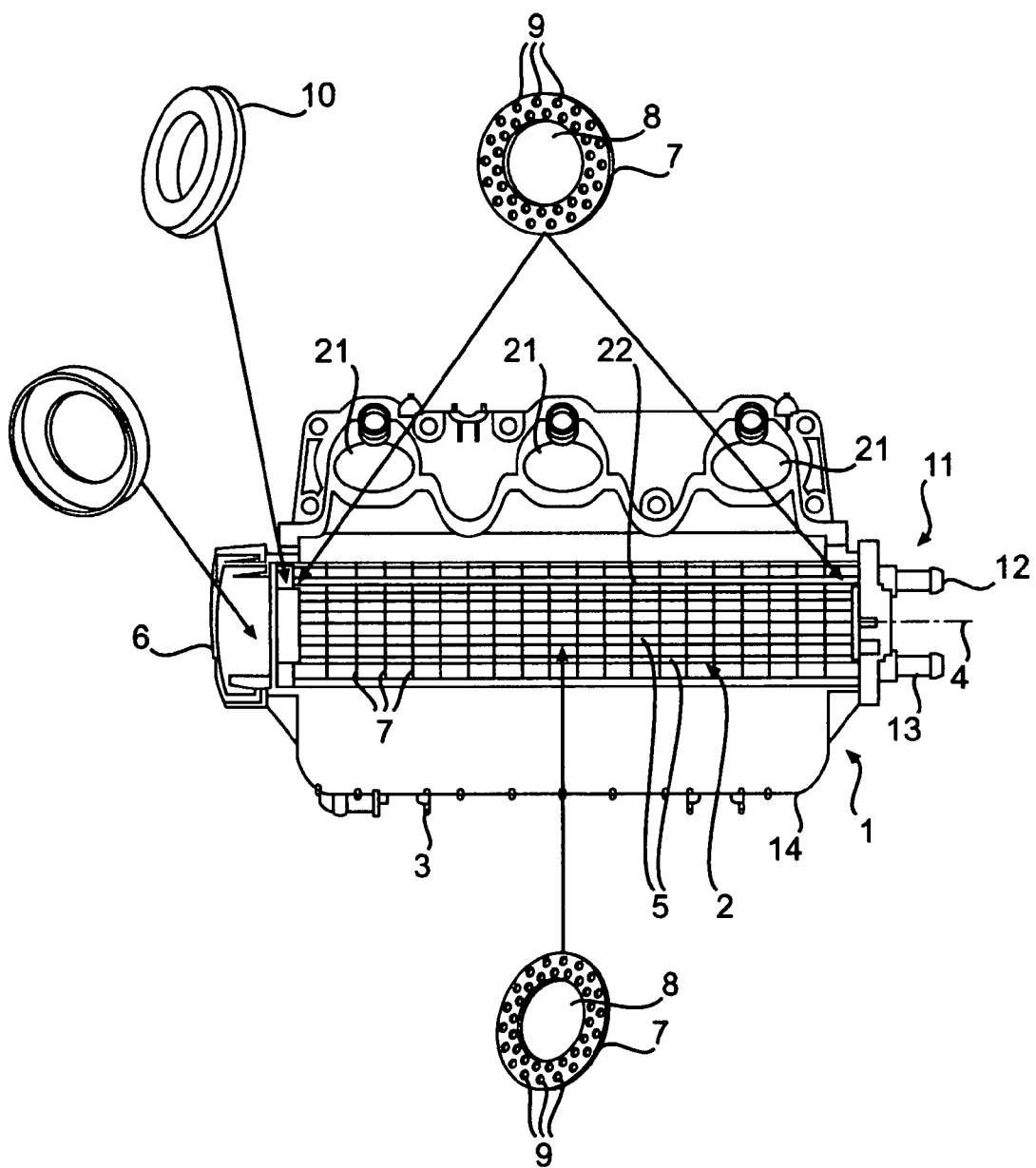
FIG. 1 is a partial cross section view of a combined flame arrester and cooler according to one embodiment of the present invention.
Figure 4:
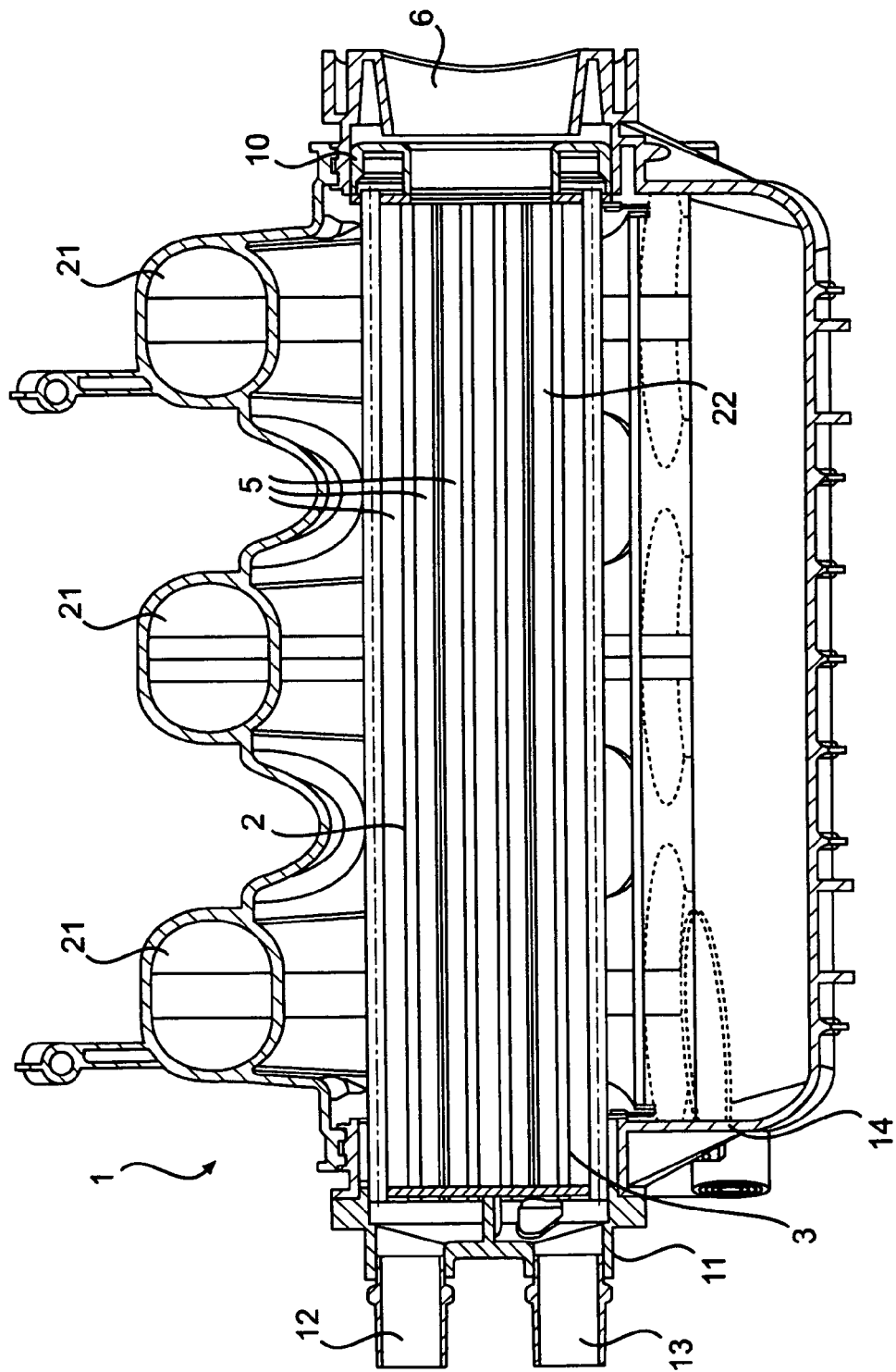
FIG. 4 is one installation variant for the combined flame arrester and cooler of FIG. 1, wherein the orientation of the flame arrester is reversed.

As shown in FIGS. 1 and 4, the air manifold 14 has a symmetrical geometry. With this arrangement, air flow into the air manifold 14 can be provided at either end of the air manifold 14, thereby enabling use of the same air manifold 14 in either a normally aspirated engine, shown in FIG. 12, or a supercharged engine, shown in FIG. 13, which can have different flow paths for air into the air intake manifold. In the normally aspirated engine, the air from a throttle 100 (if the engine has fuel injection) or a carburetor (if the engine does not have fuel injection) flows into one end of the air manifold 14. In a supercharged engine, the air can flow into the air intake manifold 14 through a throttle 100 in an opposite end.

The air manifold 14 further includes at least one intake pipe (or intake runner) 21. One intake pipe 21 corresponds to each cylinder. While three intake pipes 21 are illustrated, any number of pipes 21 can be provided so long as one pipe 21 corresponds to each engine cylinder. Each intake pipe 21 is operatively connected to a respective intake passageway or intake port (not shown) to supply air to the combustion chambers through intake openings (not shown). Each intake pipe 21 is operatively connected to a fuel injector 110. Each fuel injector 110 is connected to a common fuel rail 111. The flow pattern of the air within the air manifold 14 is indicated by the arrows in FIGS. 1 and 4. As shown, the air enters the air manifold 14 through one end through an inlet opening 6. The air passes radially through a combined flame arrester or trap and cooler 2 and then flows through each intake pipe 21 to the respective intake passageway.

Figure 12:
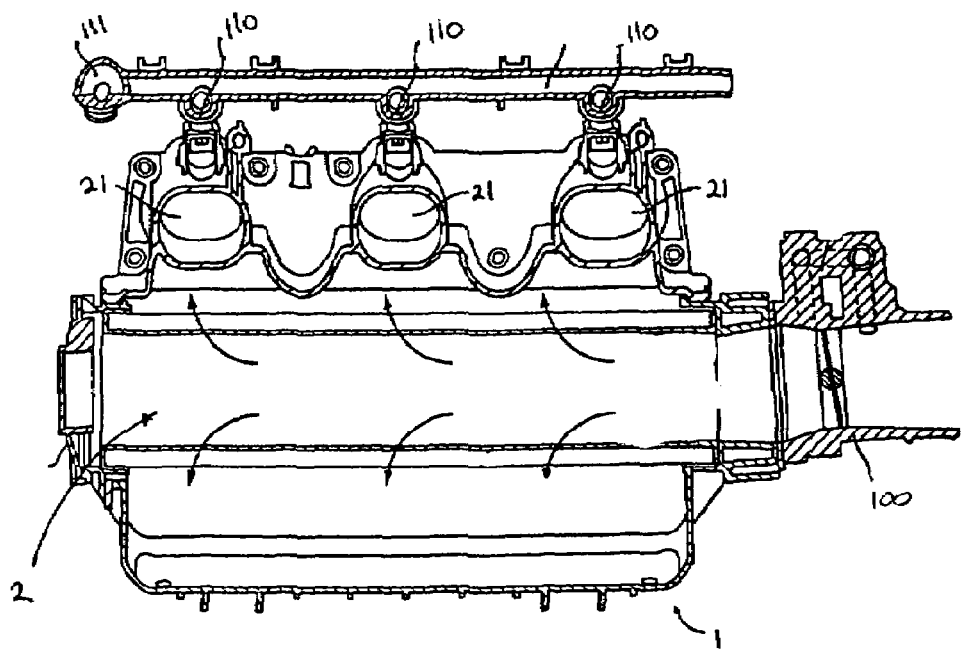
FIG. 12 is a side cross sectional view of an air intake for a normally aspirated internal combustion engine having a combined flame arrester and cooler in accordance with the embodiments of the present invention.
Figure 13:
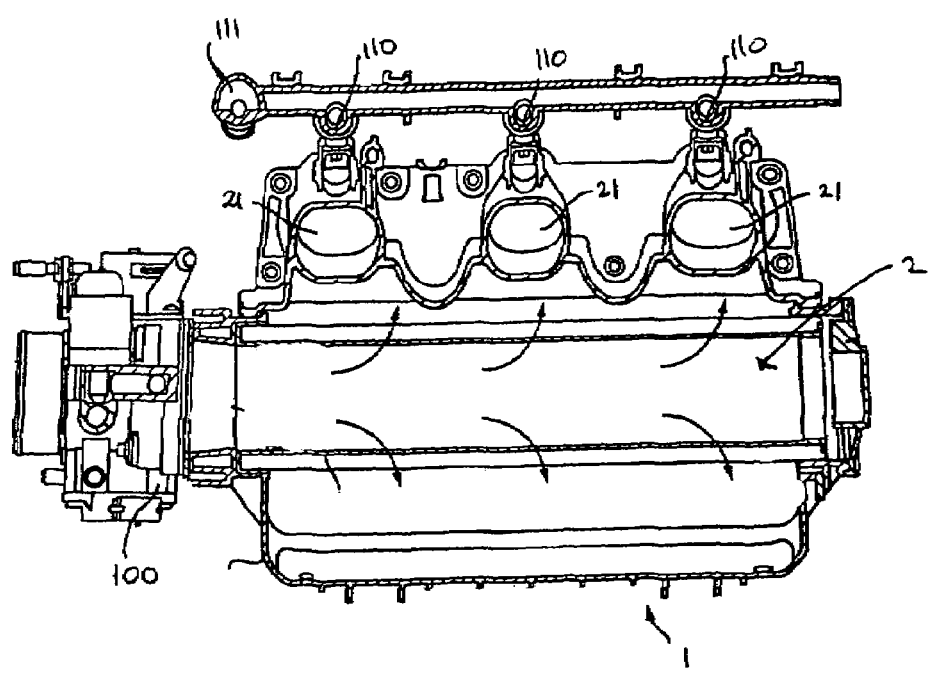
FIG. 13 is a side cross sectional view of an air intake for a supercharged internal combustion engine having a combined flame arrester and cooler in accordance with the embodiments of the present invention.

The combined flame arrester or trap and cooler 2 in the air manifold 14 prevents backfire of flames from entering the compartment interior housing the internal combustion engine. The location of the flame arrester/cooler 2 is advantageous. As shown in FIGS. 1 and 4, the flame arrester/cooler 2 is located within the central passageway in the air manifold 14. As such, the flame arrester/cooler 2 is located between the intake pipe 21 and the air inlet. In the event of a backfire, this location is advantageous because all flames are caught by the flame arrester 2 before passage to the air inlet (i.e., the throttle or the supercharger). Thus, a backfire flame cannot reach outside of the engine, which is especially important when the engine is installed on a watercraft or aircraft where an engine compartment fire can be more disastrous than in an automobile. The combined flamer arrester and cooler 2 is preferably positioned between the throttle 100 and the fuel injectors 110, as shown in FIGS. 12 and 13.

The flame arrester or trap/cooler 2 in accordance with preferred embodiments of the present invention will now be discussed in greater detail. It is desirable to cool the air or gas mixture before it enters the combustion chamber. This is especially important in a supercharged internal combustion engine where the supercharger increases the temperature of the intake air. Lowering the temperature of the intake air improves engine output and performance because it increases the density of the air entering the combustion chamber. According to preferred embodiments, the combined flame arrester/cooler 2 combines a flame arrester with an intercooler to form one structural unit. The flame arrester/cooler 2 has a generally cylindrical base body 3. The flame arrester/cooler 2 is not limited to a cylindrical base body 3; rather, other configurations are contemplated including rectangular, square, octagonal, arcuate, etc. The base body 3 includes a plurality of cooling tubes that extend generally parallel to an axis 4 of the base body 3. The tubes 5 are spaced apart from one another. The tubes 5 are spaced such that the charge air from the air box can flow around the tubes 5 prior to entering the intake pipes 21 such that the charge air is suitably cooled. A suitable coolant flows through the tubes 5 such that the tubes 5 withdraw heat from the charge air. The tubes 5 are arranged to form a hollow base body 3 which forms a central passageway 22. As shown, the tubes 5 are arranged to form a hollow cylinder. Other configurations are contemplated preferably having a hollow central passageway to permit the flow of charge air therethrough.

One end of the manifold 14 includes an inlet opening 6. Charge air from the air box enters the manifold 14 through the inlet opening 6. The charge air then flows into the central passageway 22 in the flame arrester/cooler 2. From the central passageway 22 the charge air then flows radially outward through the spaces between tubes 5 into the intakepipes 21 of the manifold 14 where it is then fed into the engine cylinders.

A plurality of plates 7 are provided between the tubes 5 to maintain the tubes 5 in their spaced relationship. The plates 7 extend transversely to the longitudinal axis 4 of the base body 3. The plates 7 improve the stability of the base body 3, which is important when functioning as a flame arrester so the tubes 5 do not rupture or fracture in response to the forces associated with a back fire. The plates 7 also improve the cooling effect on the charge air.

The plates 7 serve as large-area cooling fins. The number and spacing of the individual plates 7 can vary and is dependent upon the desired cooling effect and stability requirements. Each plate 7 can be formed of sheet metal and incorporate a central opening 8 for the charge-air feed so that the charge air flows through. A plurality of holes 9 are spaced around the periphery of the plate 7 through which the tubes 5 are routed. The diameter of the central opening 8 can vary. According to a preferred embodiment, by varying the diameter of the central opening 8, the flow distribution of the air within the central passageway 22 within the base body 3 can be regulated such that equal volumes of charge air travel through the flame arrester/cooler 2 to each of intake pipes 21 so that equal volumes of charge air are fed in the respective engine cylinder. For example, a single plate 7 is employed in the embodiment illustrated in FIG. 9. The plate 7 has a small opening to restrict the flow of air such that the charge air is forced around the tubes 5 even in the vicinity of inlet 6. The elongated arrangement of the flame arrester/cooler 2 in accordance with the present invention permits the flame arrester/cooler 2 to be used in various sized engines. A single flame arrester/cooler 2 can be used to simultaneously supply air to multiple engine cylinders. As such, a single system for cooling the charge air is employed. Similarly, a single system can be used to control the backfire from more than one engine cylinder.

Figure 5:
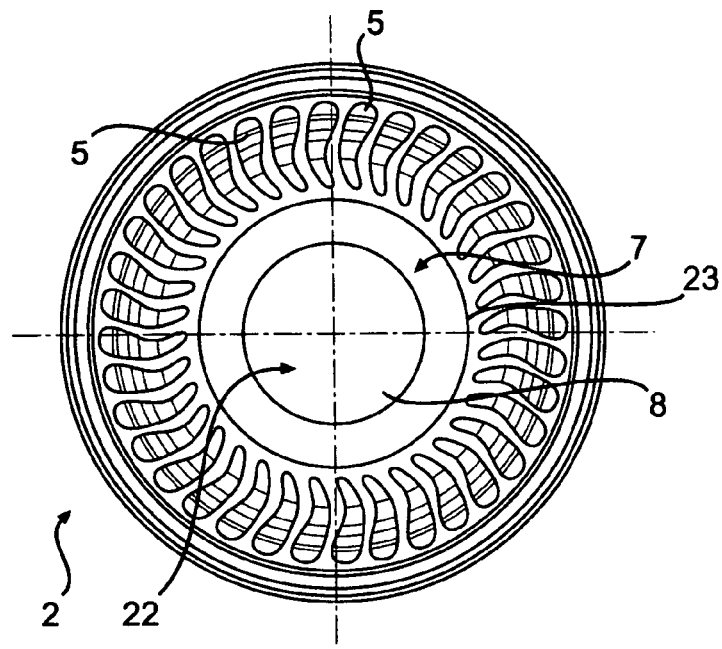
FIG. 5 is a cross sectional end view of the combined flame arrester and cooler according to another embodiment of the present invention.
Figure 6:
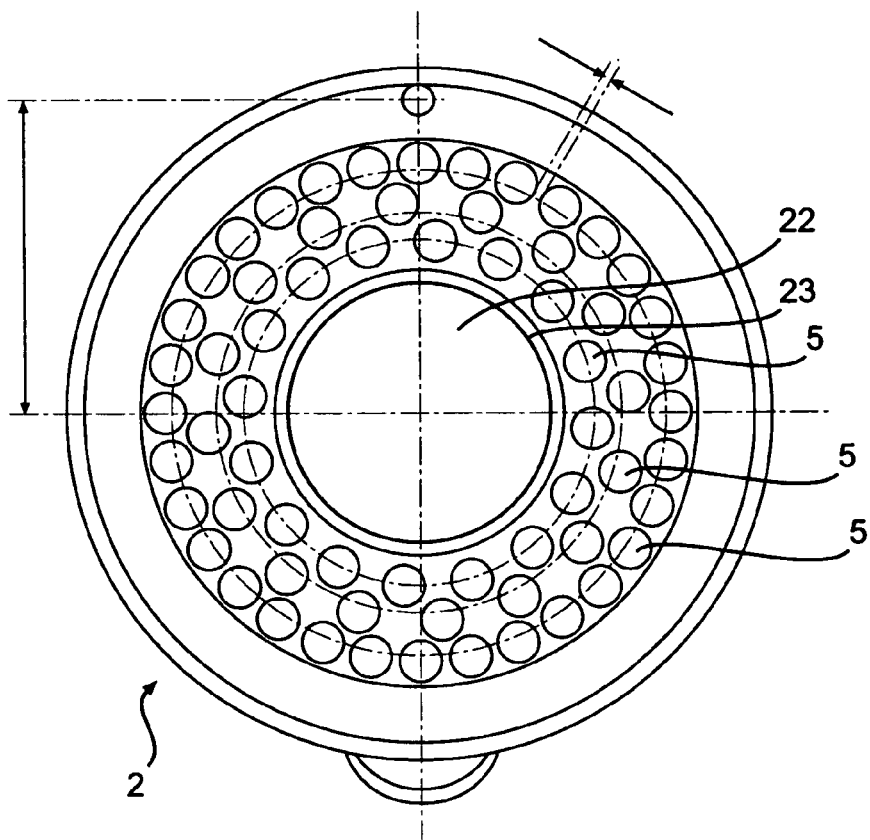
FIG. 6 is a cross sectional end view along 6—6 in FIG. 7 of the combined flame arrester and cooler according to another embodiment of the present invention.
Figure 9:
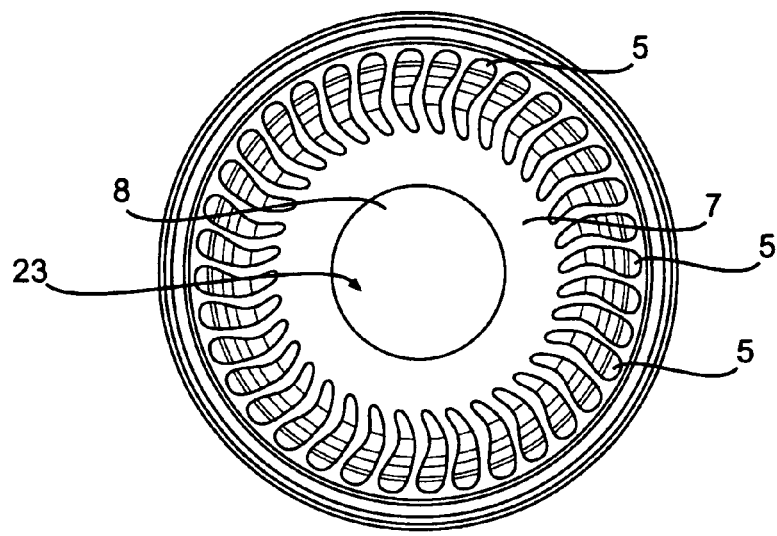
FIG. 9 is a variation of the combined flame arrester and cooler of FIG. 5.

As shown in FIG. 1, the tubes 5 are spaced apart from each other around the periphery of the base body 3. The tubes 5 can be arranged in a pair of rows. As shown in FIG. 1, the plate 7 has an outer row of openings 9 and an inner row of openings 9. It is contemplated that more than two rows of tubes 5 can be provided, as shown in FIGS. 6 and 7. It is also contemplated that only a single row of tubes 5 can be used. The size and shape of the tubes 5 can vary. The tubes 5 preferably have an inner diameter of 5 mm and an outer diameter of 6 mm. The tubes 5 can have a circular cross section as shown in FIGS. 1 and 6. The tubes 5 can also have an arcuate cross section as shown in FIGS. 5 and 9. The arcuate tubes 5 have enlarged cooling surfaces. With such an arrangement, the number of plates 7 can be reduced. Other non-circular cross sections are contemplated for the tubes 5. The arrangement can be staggered as well. The inner rows of tubes 5 in the embodiment illustrated in FIG. 6 have such an arrangement. The tubes 5 are preferably arranged to maximize air contact with the same to sufficiently cool the charge air. The tubes 5 of the inner and the outer layers are offset relative to each other, as shown in FIG. 6 and arranged so as to be positioned over the gaps in the other layer so as to improve the cooling effect and the flame arresting qualities.

At one end of the base body 3 there is an outlet ring 10 that connects the tubes 5 to one another, and at the other end there is an inlet connector 11, as shown in FIGS. 1 and 4. The inlet connector 11 connects one half of the tubes 5 to a coolant feed 12, and the other half of the tubes 5 to a coolant outlet 13. Coolant that is delivered through the coolant feed 12 flows through one half of the tubes 5 from the inlet connector 11 to the outlet ring 10 and then flows back to the inlet connector 11, where it is discharged from the flame arrester/cooler 2 by way of the coolant outlet 13. The inlet connector 11 and the coolant feed 12 can be connected to a closed-loop cooling system wherein suitable coolant is recirculated through the coolant system. It is also contemplated that the inlet connector 11 can be connected to an open loop coolant system where the coolant is supplied from an outside source such as a body of water. The flame arrester/cooler 2 is sealed into the manifold 14 of the induction system 1.

As previously stated, the number of tubes 5 and plates 7 can vary. For example, one variation is illustrated in FIG. 2. In FIG. 2, the flame arrester/cooler 2 includes a plurality of tubes 5 and plates 7. The plates 7 are spaced approximately 15 mm apart. The spacing between plates 7 can vary based upon the number of plates 7 used and the overall length of the arrester/cooler 2. In another variation illustrated in FIG. 3, the flame arrester/cooler 2 includes approximately thirty-six tubes 5 with two hundred fifty-six plates 7 that are spaced approximately 1 mm apart. With such an arrangement, the plates 7 play a greater roll in cooling the charge air. The number of plates 7 has an impact on the flow characteristics of air within the arrester/cooler 2. In the variation illustrated in FIG. 8, a single plate 7 is provided.

The flame arresting characteristics of the flame arrester/cooler 2 can be improved by providing a wire gauze 23 on an inner side or outer side of the tubes 5 or somewhere between the tubes 5 such that the gauze is positioned between the central passageway 22 and the tubes 5, as shown in FIGS. 5, 6 and 7. The gauze 23 can be formed from copper, preferably from brass, or other suitable material.

Figure 10:
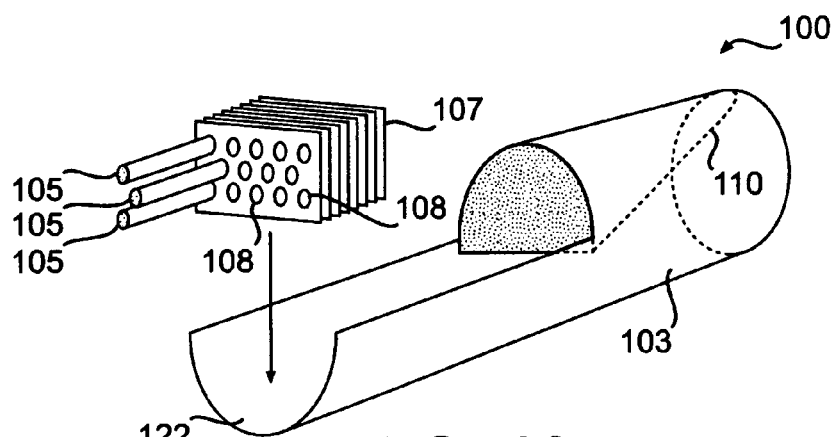
FIG. 10 is a partial exploded schematic view of the combined flame arrester and cooler according to another embodiment of the present invention.
Figure 11:
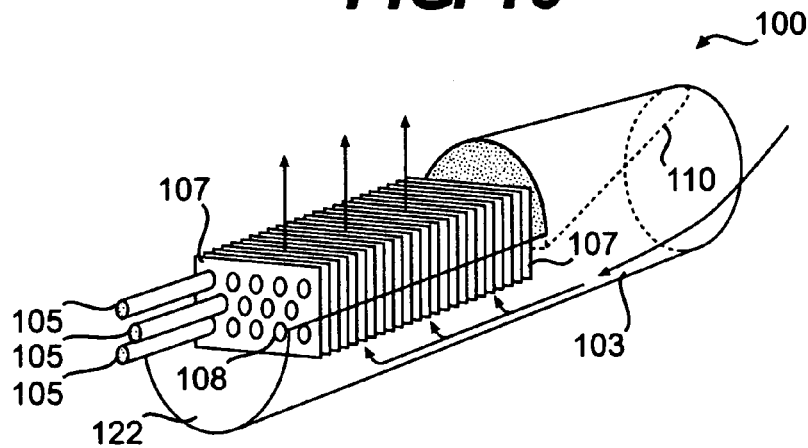
FIG. 11 is a schematic view of the combined flame arrester and cooler of FIG. 10.

A variation of the flame arrester/cooler is illustrated in FIGS. 10 and 11. Like the flame arrester/cooler 2, the flame arrester/cooler 100 includes an elongated base body 103. The elongated body 103 is sized to be received within the intake manifold or plenum 14 such that the air intake flowing into the flame arrester/cooler 100 is fed into each of the intake pipes 21. Like the embodiments of the arrester/cooler 2, described above, the arrester/cooler 100 can supply intake air to more than one cylinder.

The elongated body 103 has a central passageway 122. A plurality of cooling tubes 105 are positioned within the central passageway 122. A suitable coolant flows through the cooling tubes 105. The cooling tubes 105 can be connected to a closed-loop cooling system wherein a suitable coolant is recirculated through the coolant system. It is also contemplated that the cooling tubes 105 can be connected to an open-loop coolant system where the coolant is supplied from an outside source of coolant, such as a body of water.

A plurality of plates 107 are provided. The coolant tubes 105 extend through openings 108 in the plates 107. The plates 107 maintain the tubes 105 in their spaced relationship. Like plates 7, the plates 107 improve the cooling effect on the charge air. The tubes 105 and plates 107 function not only to cool the intake air supplied to the various engine cylinders, but to also control the backfire from any of the engine cylinders.

The body 103 includes a flow director surface 110 located within the central passageway 122. The flow director surface 110 can be a ramp or other suitable structure for directing the flow of charge air. As shown in FIG. 11, intake air is directed to a lower portion of the central passageway 122. It flows in a direction parallel to the longitudinal axis of the body 103. The air then flows radially through the spaces formed between the plates 107 and the tubes 105 such that the air is cooled before being fed into the intake pipes 21.

The foregoing illustrated embodiments are provided to illustrate the structural and functional principles of the present invention and are not intended to be limiting. To the contrary, the principles of the present invention are intended to encompass any and all changes, alterations and/or substitutions within the scope and sprit of the following claims.

What is claimed is:

1. An induction system for supplying intake gas to at least one cylinder of an internal combustion engine, the induction system comprising:
    an intake manifold; and
    an intercooler disposed at least partially in the intake manifold for cooling the intake gas, the intercooler comprising:
        a body having a longitudinal axis, and a passageway formed in the body;
        an inlet opening located on one end of the body, wherein the intake gas enters the passageway through the inlet opening; and
        a plurality of cooling tubes forming at least a portion of the body, wherein the plurality of tubes at least partially surrounds the passageway, wherein each of the plurality of cooling tubes is spaced from an adjacent cooling tube such that an air flow path is formed therebetween.

2. The induction system according to claim 1, wherein the passageway is a central passageway that extends substantially parallel to the longitudinal axis.

3. The induction system according to claim 1, wherein the plurality of tubes substantially surrounds the passageway.

4. The induction system according to claim 1, wherein the intake gas flows along the passageway within the body and radially outward therefrom through the air flow path between the cooling tubes.

5. The induction system according to claim 1, wherein the plurality of cooling tubes extends substantially parallel to the longitudinal axis.

6. The induction system according to claim 1, wherein the plurality of cooling tubes comprises:
    a first group of cooling tubes operatively connected to a coolant inlet; and
    a second group of cooling tubes operatively connected to a coolant outlet, wherein the first group of cooling tubes is operatively connected to the second group of cooling tubes such that a coolant flows from the coolant inlet into the first group of cooling tubes, the coolant then flows through the first group of cooling tubes to the second group of cooling tubes, the coolant then exits the second group of cooling tubes through the coolant outlet.

7. The induction system according to claim 6, further comprising:
    an outlet ring connected to one end of the body, wherein the outlet ring operatively connects the first group of cooling tubes to the second group of cooling tubes such that the coolant flows from the first group of cooling tubes to the second group of cooling tubes.

8. The induction system according to claim 7, wherein the outlet ring is located on an end of the body opposite the inlet opening.

9. The induction system according to claim 6, further comprising:
    an inlet ring connected to one end of the body, wherein the inlet ring includes the coolant inlet and the coolant outlet.

10. The induction system according to claim 2, further comprising:
    at least one plate extending substantially orthogonal to the longitudinal axis, wherein each of the at least one plate includes a central opening therein, wherein the central opening corresponds to the central passageway in the body such that the intake gas is capable of flowing through the central opening.

11. The induction system according to claim 10, wherein each plate comprises a plurality of openings formed therein about a periphery of the plate, wherein one of the plurality of cooling tubes is received within a corresponding one of the plurality of openings.

12. The induction system according to claim 10, wherein the at least one plate includes a plurality of plates spaced along the longitudinal axis of the body.

13. The induction system according to claim 1, further comprising:
a wire gauze extending the length of the body, the wire gauze being positioned between the passageway and the plurality of cooling tubes.

14. The induction system according to claim 1, further comprising:
at least one plate extending substantially orthogonal to the longitudinal axis, wherein each of the at least one plate includes a plurality of openings formed therein for receiving one of the plurality of cooling tubes.

15. The induction system according to claim 14, wherein the at least one plate includes a plurality of plates spaced along the longitudinal axis of the body.

16. The induction system according to claim 1, further comprising a flow director surface for directing the intake gas into the passageway.

17. An internal combustion engine comprising:
at least one engine cylinder having an intake port;
an intake manifold for supplying intake gas to the intake port; and
an intercooler for cooling the intake gas before the intake gas is supplied to the intake port, the intercooler comprising:
an body having a longitudinal axis; and
a plurality of cooling tubes being supplied with a coolant, wherein each of the plurality of cooling tubes is spaced from other cooling tubes disposed adjacent thereto such that a plurality of air flow paths is formed between the plurality of cooling tubes, wherein the intake gas flows through at least one of the plurality of air flow paths before flowing into the intake port of the at least one engine cylinder,
the intercooler being positioned at least partially within the intake manifold.

18. The internal combustion engine according to claim 17, wherein the intercooler further comprises a passageway that extends substantially parallel to the longitudinal axis.

19. The internal combustion engine according to claim 18, wherein the plurality of cooling tubes substantially surrounds the passageway.

20. The internal combustion engine according to claim 18, wherein the at least one cylinder is at least two engine cylinders,
wherein the intake manifold includes at least two intake pipes which correspond to the at least two engine cylinders,
wherein the intercooler is arranged within the intake manifold such that the intake gas flows into the passageway, then radially outward away from the passageway through the plurality of air flow paths past the plurality of cooling tubes into the at least two intake pipes.

21. The internal combustion engine according to claim 20, wherein the plurality of cooling tubes comprises:
a first group of cooling tubes operatively connected to a coolant inlet; and
a second group of cooling tubes operatively connected to a coolant outlet, wherein the first group of cooling tubes is operatively connected to the second group of cooling tubes such that a coolant flows from the coolant inlet into the first group of cooling tubes, the coolant then flows through the first group of cooling tubes to the second group of cooling tubes, the coolant then exits the second group of cooling tubes through the coolant outlet.

22. The internal combustion engine according to claim 21, wherein the intercooler further comprises:
an outlet ring connected to one end of the body, wherein the outlet ring operatively connects the first group of cooling tubes to the second group of cooling tubes such that the coolant flows from the first group of cooling tubes to the second group of cooling tubes.

23. The internal combustion engine according to claim 21, wherein the intercooler further comprises:
an inlet ring connected to one end of the body, wherein the inlet ring includes the coolant inlet and the coolant outlet.

24. The internal combustion engine according to claim 19, wherein the intercooler further comprises at least one plate positioned within the body.

25. The internal combustion engine according to claim 24, wherein each of the at least one plate includes a plurality of openings formed therein for receiving one of the plurality of cooling tubes.

26. The internal combustion engine according to claim 24, wherein the at least one plate includes a plurality of plates spaced along the longitudinal axis of the body.

27. The internal combustion engine according to claim 25, wherein each of the at least one plate includes a central opening therein,
wherein the central opening corresponds to a passageway in the body such that the intake gas is capable of flowing through the central opening through the passageway.

28. The internal combustion engine according to claim 27, wherein the intercooler further comprises a flow director surface for directing the intake gas into the passageway.

29. A combination of an intake manifold and an intercooler comprising:
an intake manifold having at least one intake pipe configured for supplying intake gas to at least one engine cylinder;
a passageway positioned within the intake manifold for supplying intake gas to the at least one intake pipe; and
an intercooler at least partially positioned within the passageway, the intercooler comprising:
a body having a plurality of cooling tubes located therein, wherein each of the plurality of cooling tubes is spaced from other cooling tubes disposed adjacent thereto such that a plurality of air flow paths is formed between the plurality of cooling tubes, wherein the intake gas flows through at least one of the plurality of air flow paths before flowing into the at least one intake pipe.

30. The combination according to claim 29, wherein the intercooler further comprises:
at least one plate positioned within the body,
wherein each of the at least one plate includes a plurality of openings formed therein for receiving one of the plurality of cooling tubes.

31. The induction system according to claim 1, further comprising a charging device disposed in the induction system upstream of the intercooler.

* * * * *